(12) United States Patent
Ozawa

(10) Patent No.: US 9,446,451 B2
(45) Date of Patent: Sep. 20, 2016

(54) MACHINE TOOL TO WHICH ROTARY TOOL UNIT CAN BE ATTACHED

(71) Applicant: STAR MICRONICS COMPANY LIMITED, Shizuoka-shi (JP)

(72) Inventor: Satoru Ozawa, Shizuoka (JP)

(73) Assignee: STAR MICRONICS COMPANY LIMITED, Shizuoka-Shi (JP)

( * ) Notice: Subject to any disclaimer, the term of this patent is extended or adjusted under 35 U.S.C. 154(b) by 245 days.

(21) Appl. No.: 14/507,852

(22) Filed: Oct. 7, 2014

(65) Prior Publication Data

US 2015/0040732 A1  Feb. 12, 2015

Related U.S. Application Data

(63) Continuation of application No. PCT/JP2013/053804, filed on Feb. 18, 2013.

(30) Foreign Application Priority Data

Apr. 24, 2012 (JP) ................................. 2012-099061

(51) Int. Cl.
  *B23B 29/32* (2006.01)
  *B23B 3/16* (2006.01)
  (Continued)

(52) U.S. Cl.
  CPC ............. *B23B 29/323* (2013.01); *B23B 3/161* (2013.01); *B23Q 1/5406* (2013.01); *B23Q 5/045* (2013.01);
  (Continued)

(58) Field of Classification Search
  CPC ........... Y10T 82/2506; Y10T 82/2508; Y10T 82/2585; Y10T 82/2587; Y10T 82/2591; Y10T 408/37; Y10T 29/5154; Y10T 29/5155; Y10T 29/5114; B23B 39/20; B23B 39/205; B23Q 5/045; B23Q 5/5406; B23Q 2220/002
  See application file for complete search history.

(56) References Cited

U.S. PATENT DOCUMENTS 5,072,636 A * 12/1991 Gueli ...................... B23B 3/162
                                                          82/132
6,467,145 B1  10/2002 Porta
(Continued)

FOREIGN PATENT DOCUMENTS

CN   201157909   12/2008
CN   102176992    9/2011
(Continued)

OTHER PUBLICATIONS

JP 2008-087089 (reference provided on the IDS) Machine Translation, pp. 8-17, Aug. 3, 2016.*
(Continued)

*Primary Examiner* — Daniel Howell
*Assistant Examiner* — Nicole N Ramos
(74) *Attorney, Agent, or Firm* — Lex IP Meister, PLLC

(57) ABSTRACT

A machine tool 1 includes a turret (4, 104) to which a tool unit 2 is adapted to be radially mounted, a cylindrical turret pivoting driving shaft (5, 105) for transmission of pivoting driving force to the turret (4, 104), a rotary tool driving shaft (8, 108) adapted to be rotated with respect to an indexing axis for transmission of rotation driving force to a tool (7, 107) of a rotary tool unit (2b, 102b) mounted on the turret (4, 104), and a unit pivoting driving shaft (12, 112) adapted to be rotated with respect to the indexing axis independently of the rotary tool driving shaft (8, 108) for transmission of pivoting driving force to the rotary tool unit (2b, 102b) mounted on the turret (4, 104) to change the direction of the rotation axis AX2 of the tool (7, 107). The rotary tool driving shaft and the unit pivoting driving shaft are coaxially arranged inside the turret pivoting driving shaft.

3 Claims, 12 Drawing Sheets

(51) Int. Cl.
*B23Q 1/54* (2006.01)
*B23Q 5/04* (2006.01)
*B23Q 5/10* (2006.01)

(52) U.S. Cl.
CPC ........... *B23Q 5/10* (2013.01); *B23Q 2220/002* (2013.01); *Y10T 29/5155* (2015.01); *Y10T 82/2508* (2015.01); *Y10T 82/2587* (2015.01)

(56) References Cited

U.S. PATENT DOCUMENTS

| | | | |
|---|---|---|---|
| 7,395,589 B1 | 7/2008 | Kuo | |
| 7,506,424 B2* | 3/2009 | Neo | B23B 29/323 29/39 |
| 2002/0032107 A1* | 3/2002 | Sheehan | B23Q 1/38 29/48.5 A |
| 2006/0254384 A1* | 11/2006 | Lu | B23Q 16/102 74/813 R |
| 2011/0154963 A1* | 6/2011 | Aoyagi | B23Q 16/102 82/159 |

FOREIGN PATENT DOCUMENTS

| | | |
|---|---|---|
| DE | 4308419 | 9/1994 |
| DE | 19830629 | 1/2000 |
| EP | 1287931 | 11/2004 |
| JP | 05-228708 | 9/1993 |
| JP | 3129696 | 2/2007 |
| JP | 2008-087089 | 4/2008 |
| TW | 339002 | 8/1998 |
| TW | 200841984 | 11/2008 |

OTHER PUBLICATIONS

Office Action, SIPO, Application No. 201380020058.6, Nov. 3, 2015.

Search Report, European Patent Office, Application No. 13781580.9, Dec. 8, 2015.

TW Office Action and Search Report, TIPO, No. 102113376, Jul. 12, 2016.

* cited by examiner

MACHINE TOOL TO WHICH ROTARY TOOL UNIT CAN BE ATTACHED

TECHNICAL FIELD

The present invention relates to a machine tool to which a rotary tool unit can be attached.

BACKGROUND ART

As such machine tool, a lathe provided with a turret to which a tool unit can be radially attached with respect to an indexing axis has been known. The cited patent document 1 discloses a turret tool post where rotation driving force is transmitted from a driving shaft provided inside a non-pivoting shaft to a rotary tool through an intermediate driving shaft. A direction of the rotation axis of the rotary tool cannot be changed from the original direction that is perpendicular to a pivoting axis of the turret. Accordingly, a secondary machining for a tilted hole would require a special tool unit for every requested angle. An increase in the number of types of the rotary tool unit would increase cost and storage space, and further the machine in size.

A composite machining lathe disclosed in the cited patent document 2 is provided with a tool axis tilting mechanism adapted to change the angle of an axis (a rotation axis) of a rotary tool by tilting a tool support head, thereby eliminating the need of a special rotary tool unit for every tilt angle. In trying to machine a workpiece, rotation driving force is transmitted from a first driving shaft provided inside a turret shaft to a tool through a cylindrical second driving shaft. The first driving shaft is driven by a tool motor at a high speed, and therefore the first driving shaft, the second driving shaft, and the tool are rotated at a high speed. In trying to rotate the tool support head, a pivoting shaft inserted to the second driving shaft and the second driving shaft are connected, and then pivoting driving force is transmitted from the first driving shaft to the tool support head through the second driving shaft and the pivoting shaft, thereby causing the tool support head to be tilted. In this case, the first driving shaft is driven by the aforementioned tool motor at a low speed, and therefore the first driving shaft, the second driving shaft, and the pivoting shaft are rotated at a low speed.

When the tool support head is tilted, the second driving shaft, through which rotation driving force is transmitted to the tool, and the pivoting shaft, through which pivoting driving force is transmitted to the tool support head, are rotated together at a low speed. Therefore, the composite machining lathe disclosed in patent 2 cannot simultaneously realize a high-speed rotation operation of the tool and a tilting operation of the tool support head. In the power servo motor turret table disclosed in cited patent document 3, in trying to rotate a cutter tool, a cutter tool rotary device related mechanism is driven by a cutter tool rotary device driving motor, and in trying to rotate a turret (a tool unit), a turret rotary device related mechanism (a tool unit pivoting device related mechanism) is driven by a servo motor. The cutter tool rotary device related mechanism is provided in a through-hole formed at a position dislocated from the center of an adjacent convex block. The tool unit pivoting device related mechanism is provided in another though-hole formed at another position dislocated from the center of the convex block. A plurality of passive gears to be engaged with gears of the tool unit is provided around the turret table. Rotation of the servo motor is transmitted to a gear wheel in the turret table through a power transmission bar and a transmission gear. The gear wheel is eccentric from a pivoting axis of the turret table and then engaged with one of the passive gears.

PRIOR ART DOCUMENT

Patent Document

Patent 1: Japanese Patent No. 2889426
Patent 2: Japanese Patent Application Publication No. 2008-87089
Patent 3: Japanese Utility No. 3129696

DISCLOSURE

Technical Problem

The power servo turret table disclosed in patent 3 requires the tool unit pivoting device related mechanism configured to be eccentric from the pivoting axis of the turret table and further requires a plurality of passive gears. The number of parts is thereby increased and the structure is thereby complicated. Such a problem also exists in various machine tools where a rotary tool unit is mountable.

The purpose of the present invention is to simultaneously achieve a high-speed rotation operation and a tilt operation of a tool with a simple structure

Technical Solution

A machine tool to which a rotary tool unit is adapted to be mounted according to the present invention includes: a turret to which a tool unit is adapted to be radially mounted with respect to an indexing axis; a cylindrical turret pivoting driving shaft adapted to be rotated with respect to the indexing axis for transmission of pivoting driving force to the turret; a rotary tool driving shaft adapted to be rotated with respect to the indexing axis for transmission of rotation driving force to a tool of the rotary tool unit mounted on the turret; and a unit pivoting driving shaft adapted to be rotated with respect to the indexing axis independently of the rotary tool driving shaft for transmission of pivoting driving force to the rotary tool unit mounted on the turret to change the direction of a rotation axis of the tool, wherein the rotary tool driving shaft and the unit pivoting driving shaft are coaxially arranged inside the turret pivoting driving shaft.

That is, the rotary tool driving shaft and the unit pivoting driving shaft provided inside the turret pivoting driving shaft are adapted to be independently rotatable with respect to the indexing axis. In addition, the rotary tool driving shaft and the unit pivoting driving shaft are coaxially provided. Accordingly, a high-speed rotation operation and a tilt operation of the tool are simultaneously achieved with a simple structure.

Here, a rotary tool connection shaft may be provided to transmit a rotation driving force from the rotary tool driving shaft to a tool of an indexed rotary tool unit. In addition, a unit pivoting connection shaft may be provided to transmit a pivoting driving force from the unit pivoting driving shaft to the indexed rotary tool unit.

The unit pivoting driving shaft may be provided inside or outside the rotary tool driving shaft. A support shaft to which a connection shaft support for supporting at least one of the rotary tool connection shaft and the unit pivoting connection shaft is fixed may be provided inside the rotary tool driving shaft and the unit pivoting driving shaft. The support shaft may be solid or hollow cylindrical. One end of the support shaft may be mounted on a tool post body with the other end thereof having the connection shaft support fixed thereto, thereby making the machine tool compact.

The rotary tool connection shaft and the unit pivoting connection shaft may be coaxially provided with respect to an axis that is different from the indexing axis in direction, thereby making the machine tool more compact.

Advantageous Effects

According to the present invention related to claim 1, a high-speed rotation operation and a tilt operation of a tool can be simultaneously implemented with a simple structure.

According to the present invention related to claim 2, a compact machine tool that can simultaneously implement a high-speed rotation operation and a tilt operation of a tool can be provided.

According to the present invention related to claim 3, a more compact machine tool that can simultaneously implement a high-speed rotation operation and a tilt operation of a tool can be provided.

BRIEF DESCRIPTION OF THE DRAWINGS

FIG. 2 is a partial cross-sectional view exemplarily illustrating main parts of a turret tool post 1a.

FIG. 12A is an exemplary perspective view of the main parts of the turret tool post 1a, and FIG. 12B is a side view of the main parts of the turret tool post 1a.

MODE FOR INVENTION

Hereinafter, an exemplary embodiment of the present invention will be described. The embodiment described hereinafter is merely an exemplary embodiment of the present invention.

1. Summary of Machine Tool where a Rotary Tool Unit can be Attached

Figure 1A:
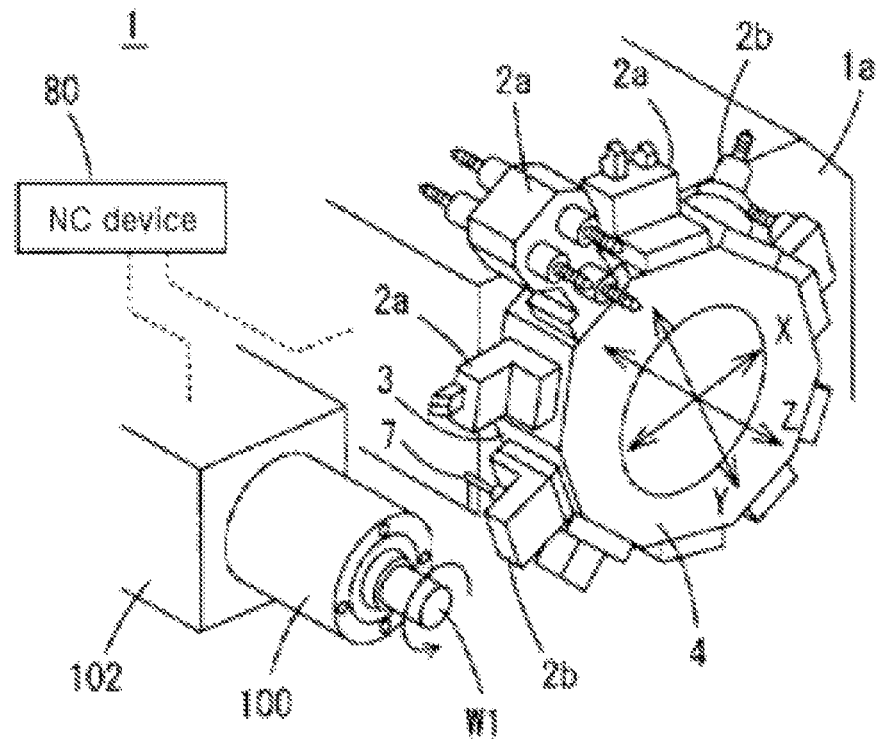
FIG. 1A is a perspective view exemplarily illustrating a CNC (computerized numerical control) lathe 1.

FIG. 1A is a perspective view of a CNC (computerized numerical control) lathe 1 that exemplarily illustrates the aforementioned machine tool. The lathe 1 is provided with a headstock 102 having a spindle 100, a turret tool post 1a having a turret 4, and an NC (numerical control) device 80. An X direction is a direction along a control axis called the X axis, a Y direction is a direction along a control axis called the Y axis, and a Z direction is a direction along a control axis called the Z axis. The X, Y, and Z directions are perpendicular to each other.

A workpiece W1 is releasably chucked by the spindle 100 to be rotated on the rotation axis AXW1 of the spindle 100. The spindle 100 is guided together with the headstock 102 in the direction of the rotation axis AXW1 of the spindle 100 on a headstock table (not shown). In addition, a plurality of headstocks such as a combination of the headstock and a counter headstock may be provided in the lathe. Further, a guide bush for slidably supporting the workpiece W1 in the AXW1 direction may be mounted on the spindle 100 so as to be rotated synchronously therewith. The turret 4 is substantially formed in the shape of a polygon with its center at an indexing axis AX1 (refer to FIG. 2), having a plurality of turret surfaces 3 on the circumference of the turret 4 to which a tool unit 2 is mounted. Thus, the tool unit 2 can be radially mounted on the turret 4 with respect to the indexing axis AX1. The turret tool post 1a shown in FIG. 1A is configured to be movable in the X, Y, and Z directions by a servo motor (not shown) and a ball screw and nut mechanism (not shown). Thus, the turret tool post 1a is guided in the X direction, the Y direction, and the Z direction on a tool post table (not shown). Movement of the headstock or the turret tool post is not limited to the aforementioned direction. The NC device 80 is a computer including a central processing unit (CPU), a read only memory (ROM), a random access memory (RAM), a clock circuit, and an interface (I/F). The NC device 80 controls operation of each part of the lathe 1, such as movement of the headstock 102, a rotation operation of the spindle 100, movement of the turret tool post 1a, and a rotation operation of the turret 4, and a rotation operation and a tilt operation of the tool 7.

Figure 1B:
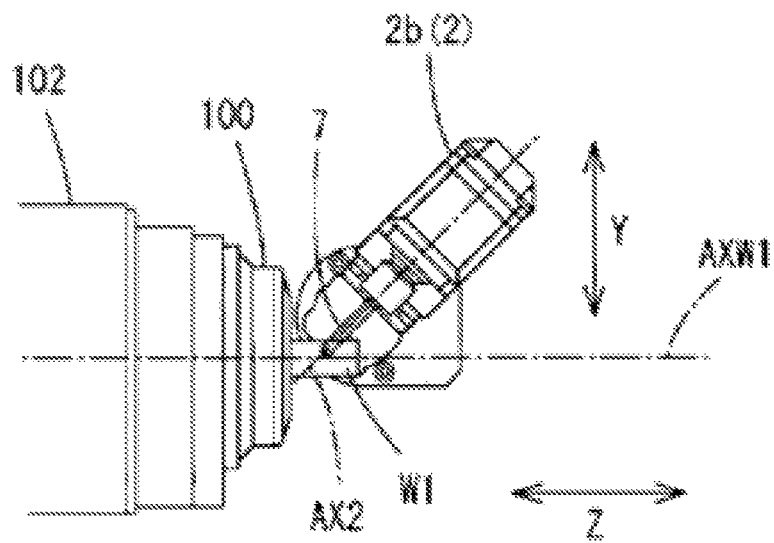
FIG. 1B is a top plan view exemplarily illustrating main parts of the lathe 1.

The tool unit 2 to be mounted on the turret surface 3 includes a stationary tool unit 2a for performing, for example, a turning or cutting operation and a rotary tool unit 2b for performing, for example, a drilling or milling operation on the circumference of the workpiece W1. As the shape of a part is more complicated, as shown in FIG. 1B, a tilt drilling or a tilt milling of a desired angle with respect to the rotation axis AXW1 of the spindle is more requested.

Figure 2:
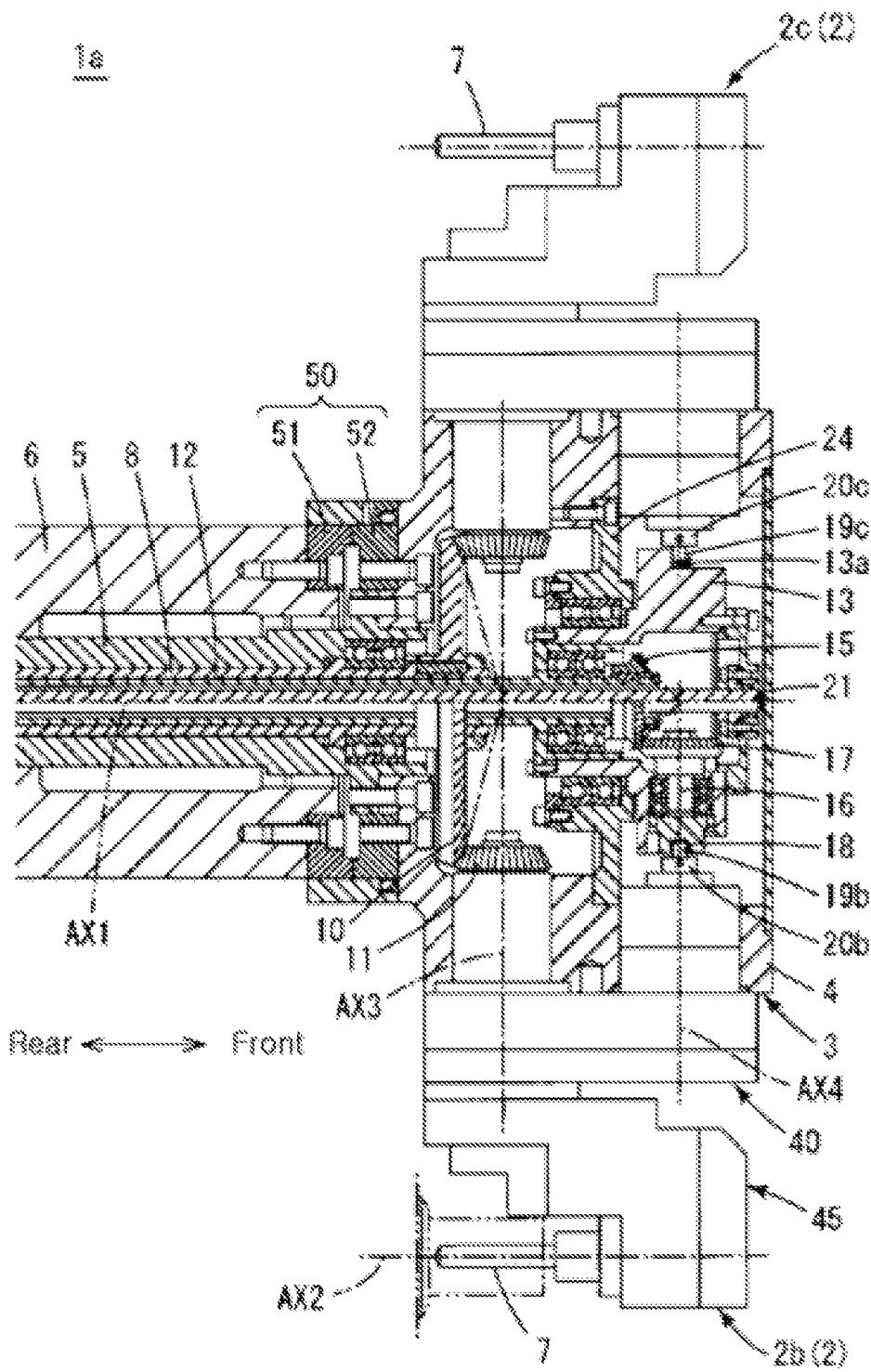
Figure 3:
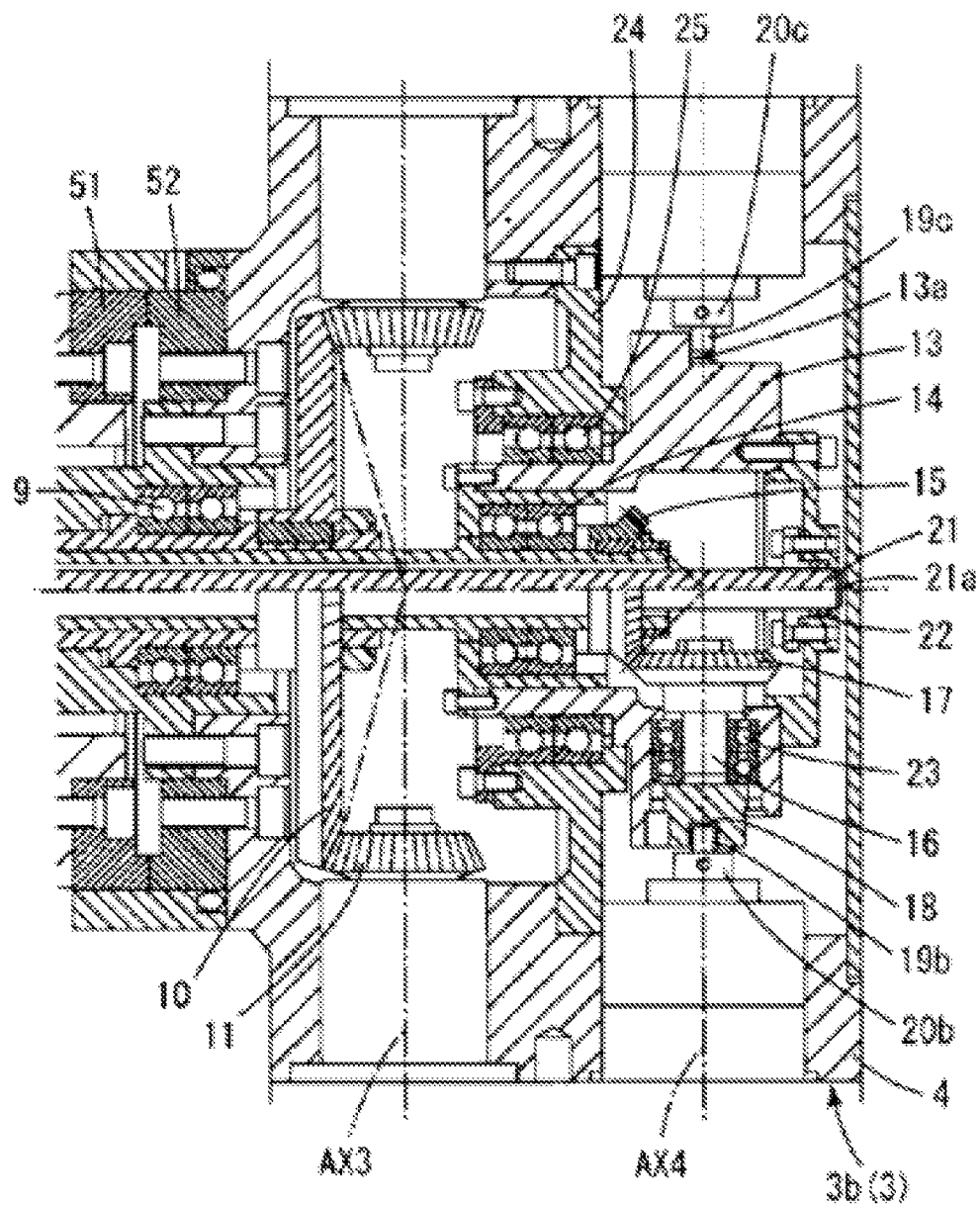
FIG. 3 is enlarged exemplary view of the main parts of FIG. 2.
Figure 7:
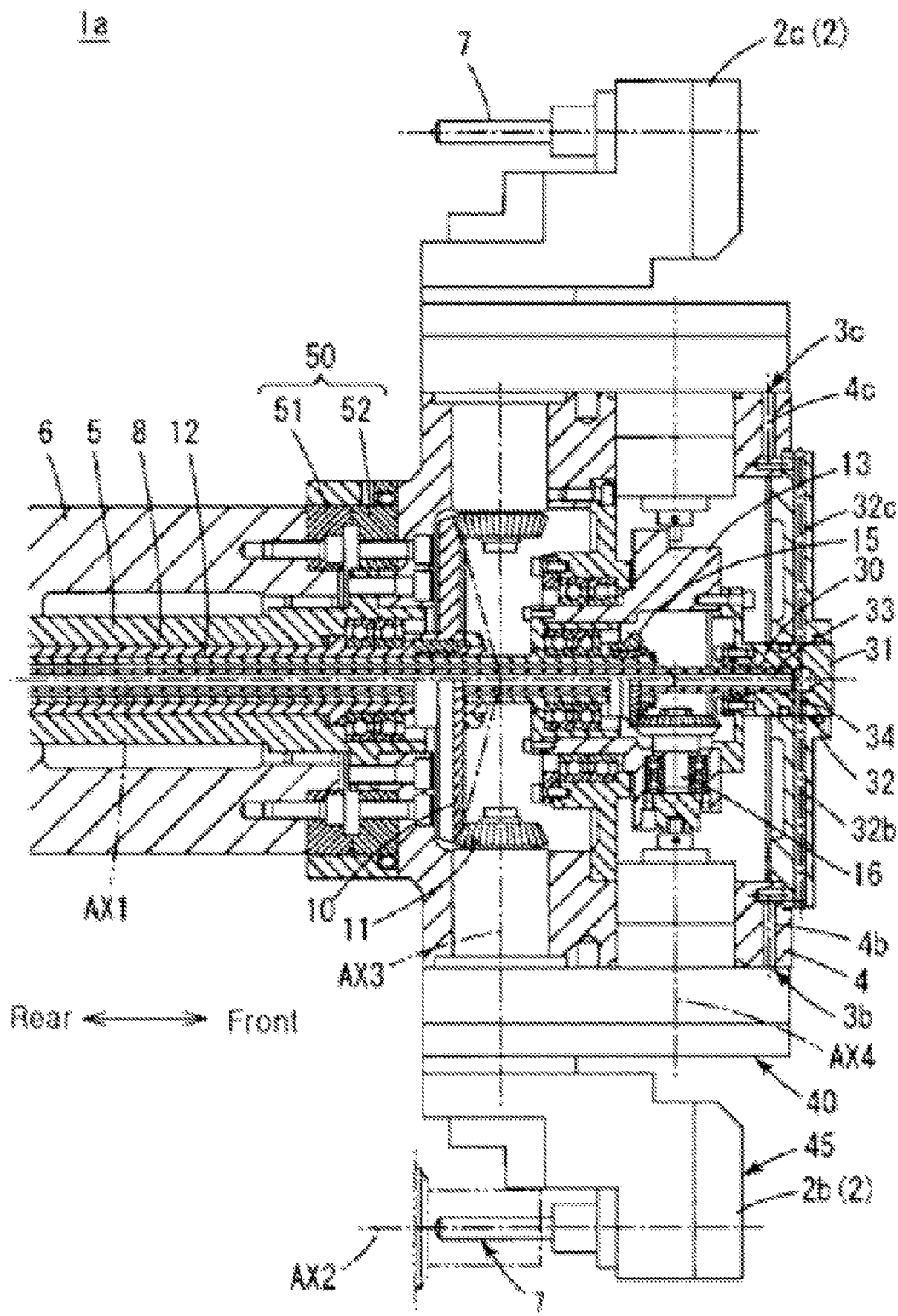
FIG. 7 is an exemplary cross-sectional view of main parts of the turret tool post 1a where a coolant passage 33 is formed in a gear box support shaft 30.
Figure 8:
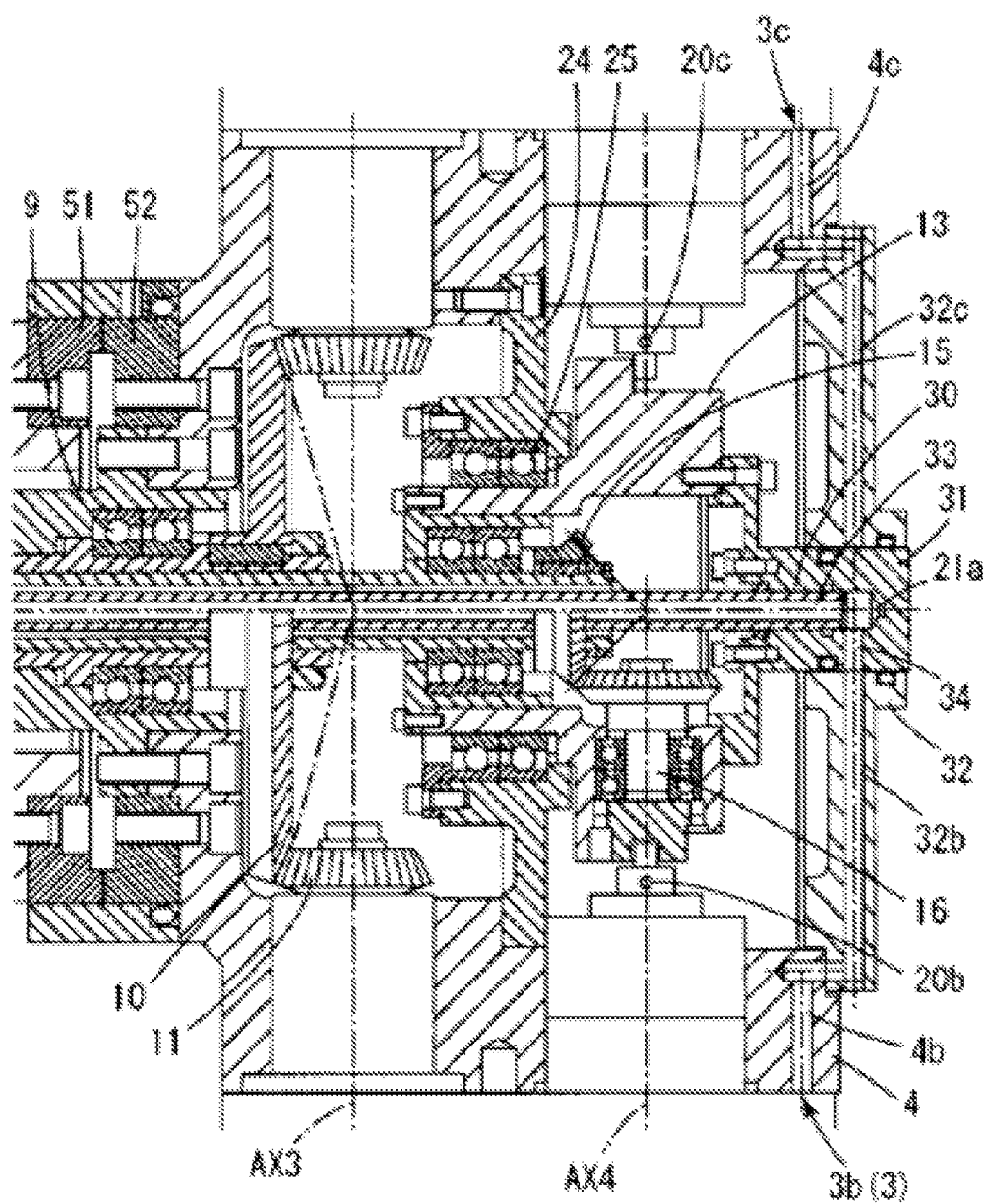
FIG. 8 is an enlarged view illustrating the main parts of FIG. 7.
Figure 9:
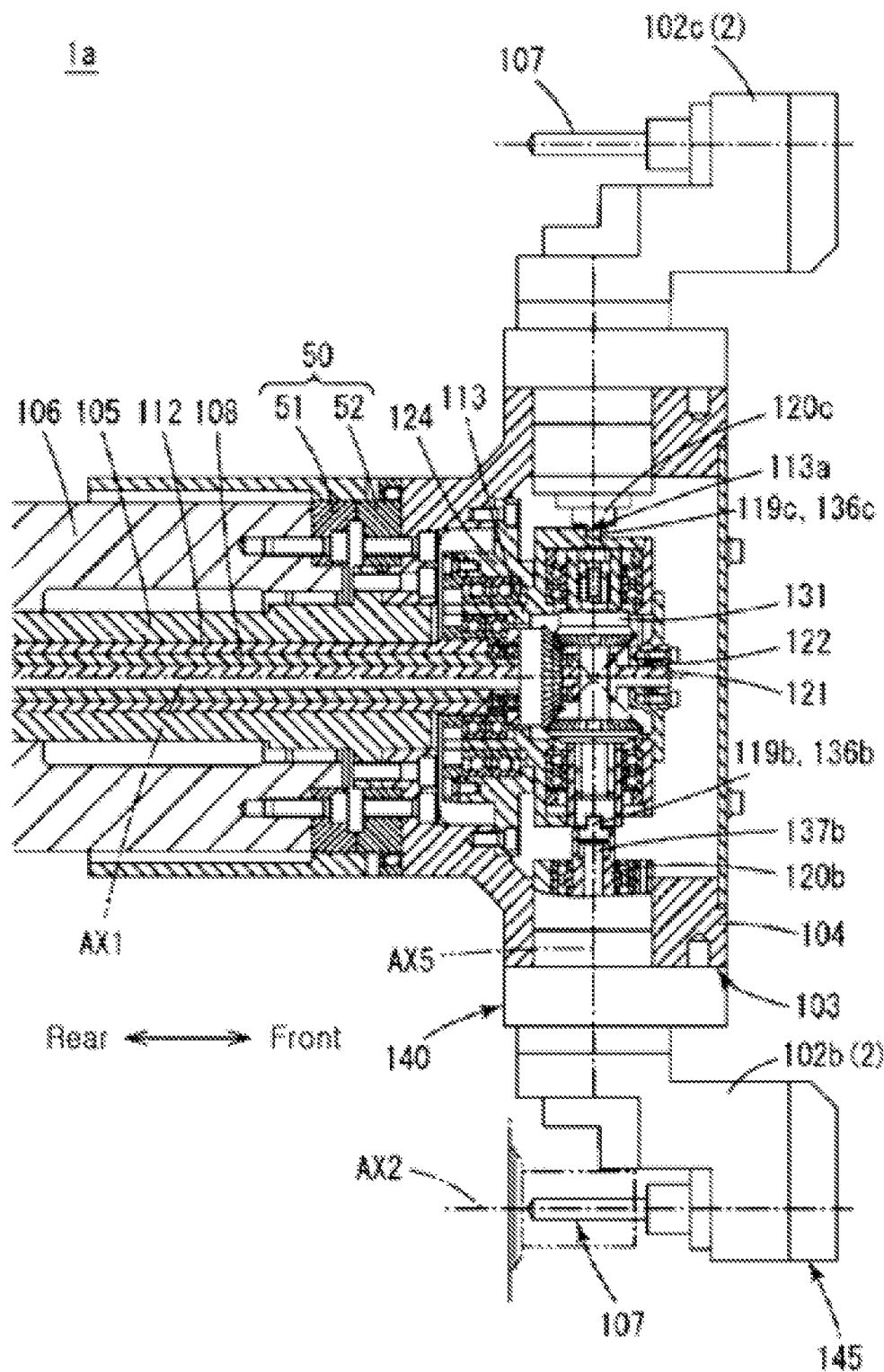
FIG. 9 is an exemplary cross-sectional view of the main parts of the turret tool post 1a where a rotary tool connection shaft 131 and a unit pivoting connection shaft 116 are coaxially arranged.
Figure 10:
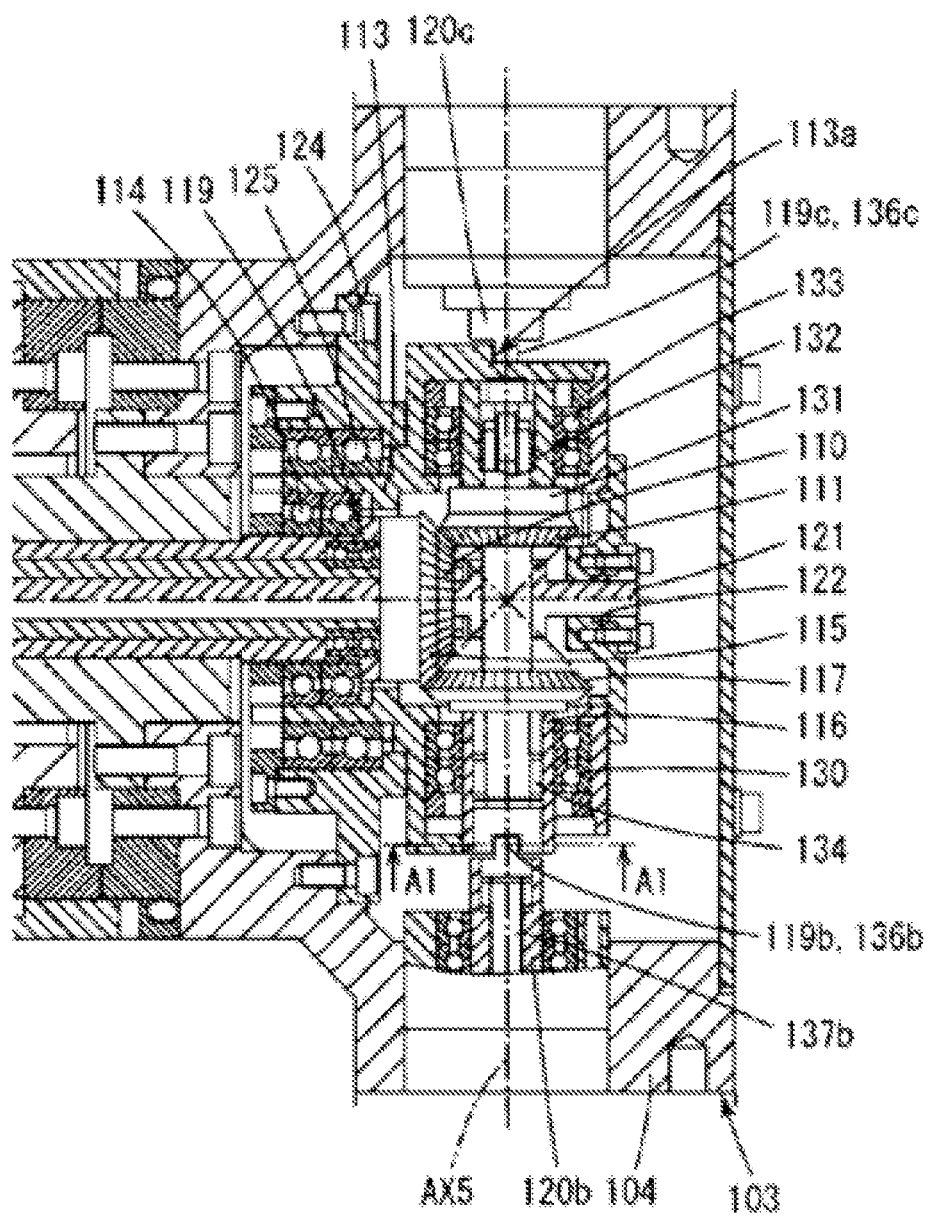
FIG. 10 is an enlarged view of the main parts of FIG. 9.

FIG. 2, FIG. 3, and FIG. 7 to FIG. 10 are partial cross-sectional views of the main parts of the turret tool post 1a. Here, FIG. 2 and FIG. 3 are cross-sectional views of the upper half of a gear box support shaft 21 and upper halves of bevel gears 10 and 15. FIG. 7 and FIG. 8 are cross-sectional views of the upper half of a gear box support shaft 30 and the upper halves of the bevel gears 10 and 15. FIG. 9 and FIG. 10 are cross-sectional views of the upper half of a gear box support shaft 121. The gear box support shaft (21, 30, 121) is attached to a tool post body (6, 106) at the rear end 21b of the shaft, which is the furthest side away from the turret (4, 104).

First, a machine tool will be schematically described as an example of the lathe 1.

The machine tool is provided with the turret (4, 104), a turret pivoting driving shaft (5, 105), a rotary tool driving shaft (8, 108), and a unit pivoting driving shaft (12, 112). The turret pivoting driving shaft (5, 105) is substantially formed in the shape of a cylinder, and rotatably disposed with respect to the indexing axis AX1. The turret pivoting driving shaft (5, 105) is a cylindrical member for transmission of pivoting driving force from a turret pivoting driving servo motor M1 shown in FIG. 6A and FIG. 6B to the turret (4, 104). The rotary tool driving shaft (8, 108) is substantially formed in the shape of a cylinder, and rotatable with respect to the same indexing axis AX1 independently of the turret pivoting driving shaft (5, 105). The rotary tool driving shaft (8, 108) is a cylindrical member for transmission of rotation driving force from a rotary tool driving motor M2 shown in FIG. 6A and FIG. 6B to the tool (7, 107) of the rotary tool unit (2*b*, 102*b*) mounted on the turret (4, 104). The unit pivoting driving shaft (12, 112) is substantially formed in the shape of a cylinder, and rotatable with respect to the same indexing axis AX1 independently of the turret pivoting driving shaft (5, 105) and the rotary tool driving shaft (8, 108). The unit pivoting driving shaft (12, 112) is a cylindrical member for transmission of pivoting driving force from a unit pivot driving servo motor M3 shown in FIG. 6A and FIG. 6B to the rotary tool unit (2*b*, 102*b*) mounted on the turret (4, 104). The pivoting driving force is a force that changes the direction of the rotation axis AX2 of the tool (7, 107).

In addition, the above-stated cylindrical shape includes various shapes of rotatable barrels, and it is not limited to the cylindrical shape.

The rotary tool driving shaft (8, 108) and the unit pivoting driving shaft (12, 112) are coaxially provided inside the turret pivoting driving shaft (5, 105). In the machine tool of the present invention, a high-speed rotation operation and a tilt operation of the tool (7, 107) are simultaneously achieved with a simple structure.

In addition, a rotary tool connection shaft 131 may be provided in the machine tool to transmit rotation driving force from the rotary tool driving shaft (8, 108) to the tool (7, 107) of the indexed rotary tool unit (2*b*, 102*b*). The rotary tool connection shaft 131 shown in FIG. 9 to FIG. 11 is rotatable with respect to an axis (i.e., an intermediate rotation axis AX5) whose direction is different from the indexing axis AX1.

In addition, a unit pivoting connection shaft (16, 116) may be provided in the machine tool to transmit pivoting driving force from the unit pivoting driving shaft (12, 112) to the indexed rotary tool unit (2*b*, 102*b*). The unit pivoting connection shaft (16, 116) shown in FIG. 2 to FIG. 4, FIG. 7, and FIG. 8 are rotatable with respect to an axis (an intermediate rotation axis AX4 and the intermediate rotation axis AX5) whose direction is different from the indexing axis AX1.

Further, a connection shaft support (13, 113) for supporting at least one of the rotary tool connection shaft 131 and the unit pivoting connection shaft (16, 116) may be fixed to the front end 21*a* of the gear box support shaft (21, 30, 121). The gear box support shaft (21, 30, 121) may be provided inside the rotary tool driving shaft (8, 108) and the unit pivoting driving shaft (12, 112) around the indexing axis AX1. Since the connection shaft support (13, 113) is fixed to the front end 21*a* of the gear box support shaft (21, 30, 121) whose rear end 21*b* is fixed to the tool post body (6, 106), such structure can make the machine tool compact.

Figure 11:
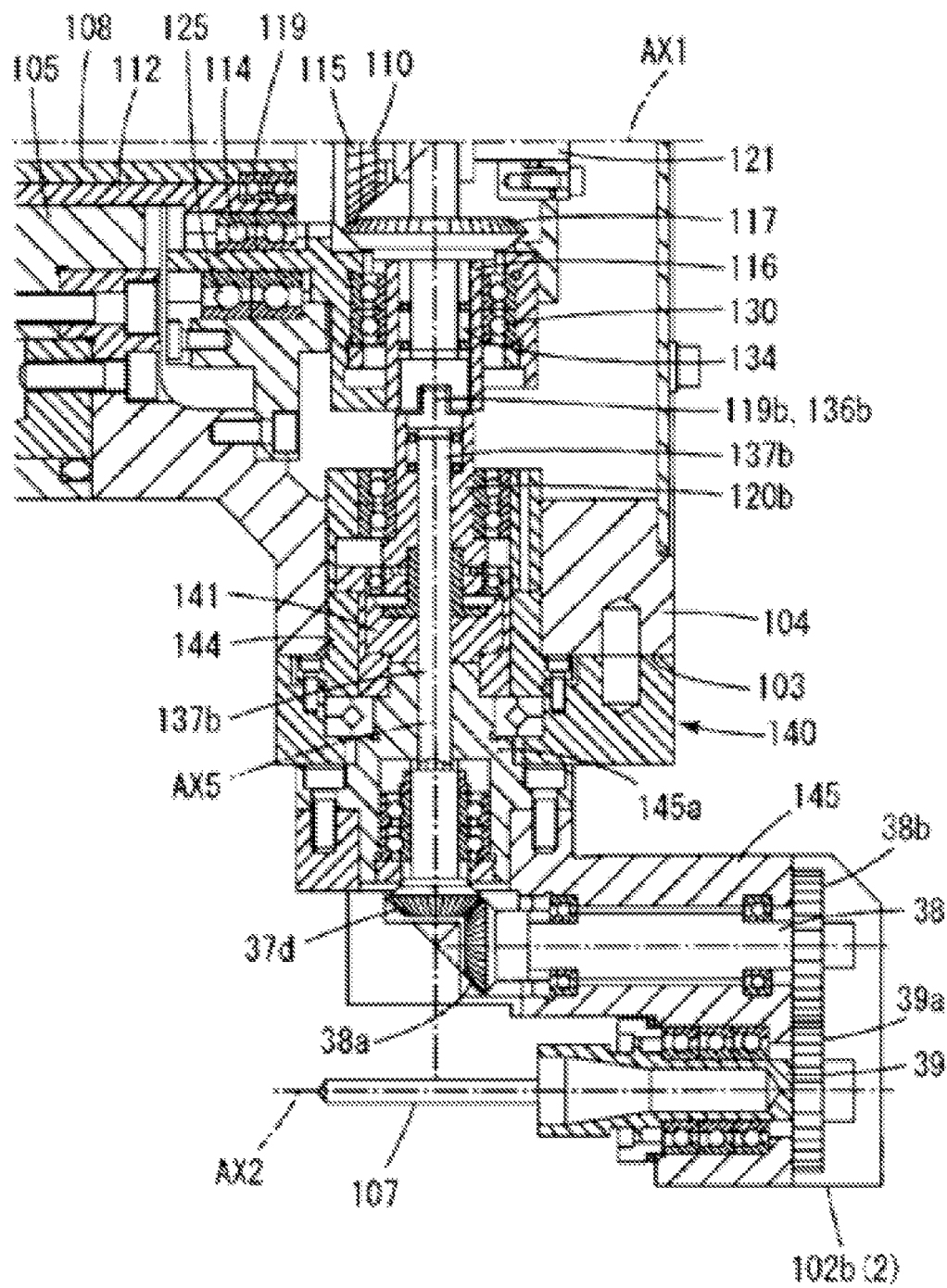
FIG. 11 is a partial exemplary cross-sectional view of the rotary tool unit 102b.

In addition, as shown in FIG. 9 to FIG. 11, the rotary tool connection shaft 131 and the unit pivoting connection shaft 116 may be coaxially provided with respect to the axis (i.e., the intermediate rotation axis AX5) whose direction is different from the indexing axis AX1. Such structure can make the machine tool more compact.

2. First Embodiment

FIG. 2 and FIG. 3 show a partial cross-sectional view illustrating main parts of the turret tool post 1*a* provided with a pivoting mechanism for controlling the tool unit 2 mounted on the turret surface 3 according to the first embodiment. For convenience of description, the rotary tool unit mounted on the turret surface 3 at an indexed position is denoted as "the rotary tool unit 2*b*", and the rotary tool unit mounted on the turret surface 3 at a non-indexed position is denoted as "a rotary tool unit 2*c*".

The turret tool post 1*a* is provided with the tool post body 6, the turret 4, the turret pivoting driving shaft 5, the rotary tool driving shaft 8, the unit pivoting driving shaft 12, the unit pivoting connection shaft 16, the gear box (connection shaft support) 13, and the gear box support shaft 21. Behind a coupling device 50, the gear box support shaft 21, the unit pivoting driving shaft 12, the rotary tool driving shaft 8, the turret pivoting driving shaft 5, and the tool post body 6 are coaxially arranged with respect to the indexing axis AX1 in the order with the gear box support shaft 21 arranged innermost and the tool post body 6 arranged outermost. The unit pivoting driving shaft 12, the rotary tool driving shaft 8, and the turret pivoting driving shaft 5 are independently rotatable with respect to the indexing axis AX1.

Figure 4:
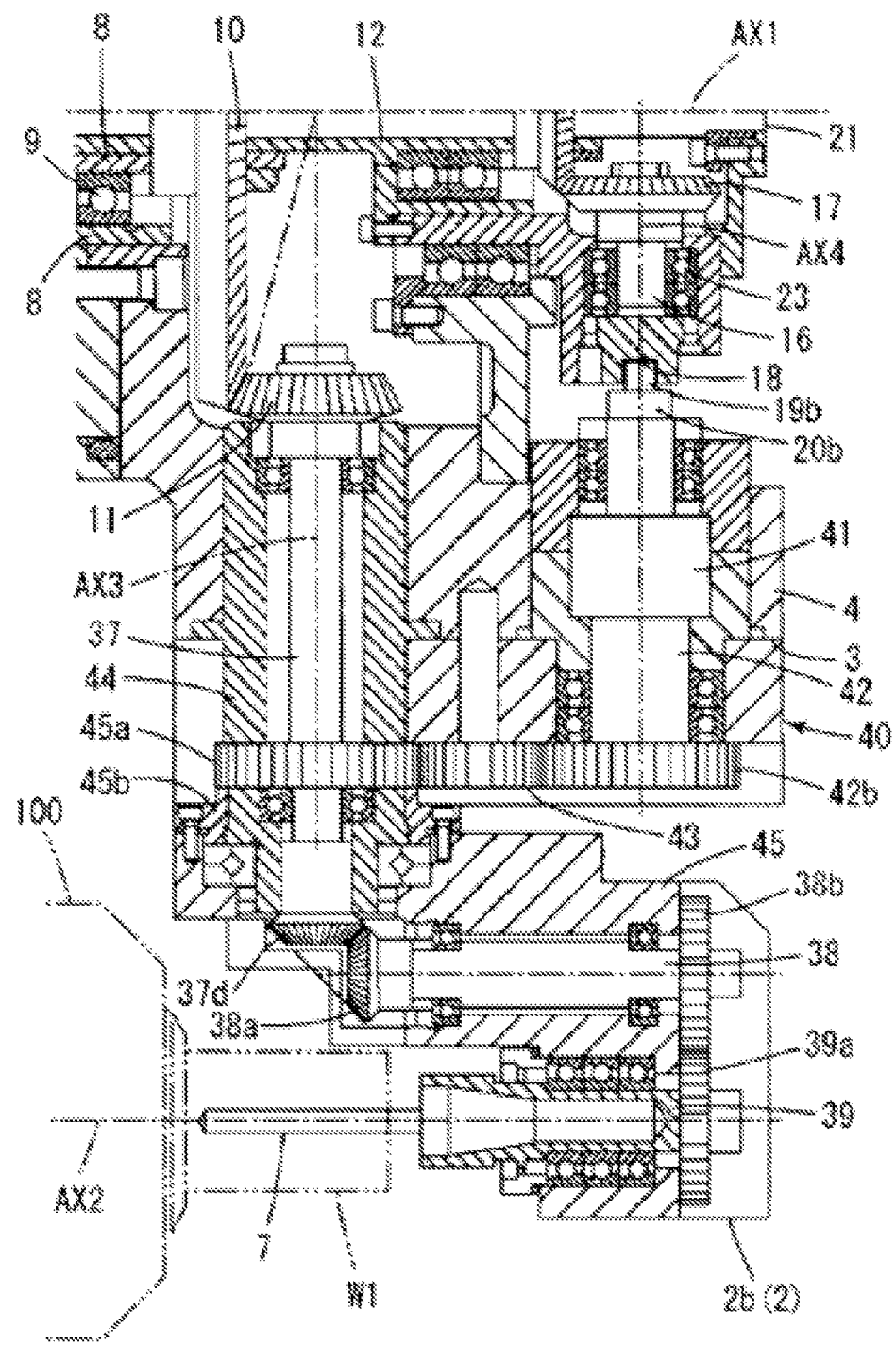
FIG. 4 is an exemplarily cross-sectional view illustrating a part of a rotary tool unit 2b.

In addition, FIG. 4 is an example illustrating the rotary tool unit 2*b* mounted on the turret surface 3 of the turret 4 in a partial cross-sectional view. The rotary tool unit 2*b* includes a fixed portion 40 and a pivoting portion 45. The fixed portion 40 includes a rotary tool input shaft 37, a pivot input shaft 20*b*, a decelerator 41, a pivot intermediate shaft 42, a spur gear 43, and a bearing case 44. The pivoting portion 45 includes a rotary tool intermediate shaft 38, a rotary tool shaft 39, and a pivoting shaft 45*b*. In addition, main parts of the turret tool post 1*a* or the tool unit 2 may be made of, for example, a metal. This is the same in the following embodiments.

The turret 4 is fixed to the front end of the turret pivoting driving shaft 5. The turret pivoting driving shaft 5 is rotatably supported by the tool post body 6 through a bearing. Thus, the turret 4 is pivotably mounted to the front portion of the turret tool post 1*a*. In addition, the coupling device 50 is disposed between the turret 4 and the tool post body 6. The coupling device 50 may be a curvic coupling comprising a driving-side coupling member 51 provided at the front portion of the tool post body 6 and a driven-side coupling member 52 provided at the rear side of the turret 4. When the turret pivoting driving shaft 5 is moved backward (i.e., to the left side in FIG. 2) by a cylinder such as a hydraulic cylinder, the coupling members 51 and 52 are engaged so that the turret 4 is held at a predetermined indexing position. When the turret pivoting driving shaft 5 is moved forward (i.e., to the right side in FIG. 2) by the cylinder, the coupling members 51 and 52 are disengaged so that the turret 4 is allowed to be rotated.

Figure 6A:
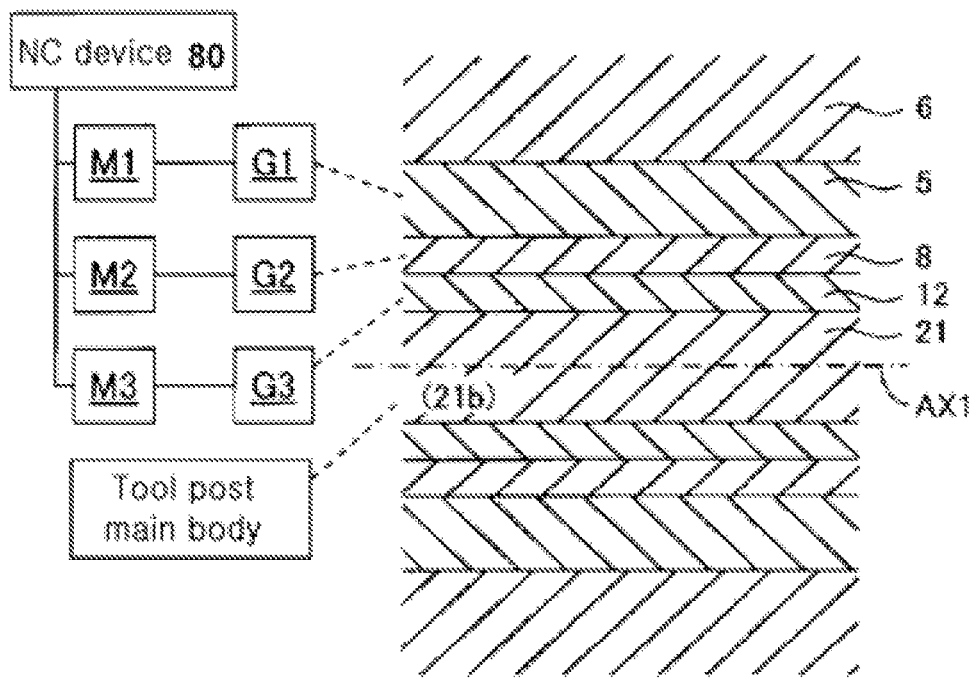
FIG. 6A and FIG. 6B schematically illustrate an electrical system of the lathe 1.

As shown in of FIG. 6A, when the coupling members 51 and 52 are disengaged, the turret pivoting driving serve motor M1 is allowed to pivot the connected turret 4 through a power transmission device G1 such as a transmission gear and the turret pivoting driving shaft 5. The NC device 80 sends a command to the motor M1 to index the turret surface 3 where the tool unit 2 to be used is mounted. A plurality of different tool units 2 are mounted on the external circumference of the turret 4. In the lathe 1, the tool units 2 are sequentially indexed and the indexed tool units 2 are controlled to be moved in the X, Y, and Z directions so as to machine the workpiece W1 held by the spindle 100.

The rotary tool driving shaft 8 provided inside the turret pivoting driving shaft 5 is rotatably supported by a bearing 9 fixed to the turret pivoting driving shaft 5. The bevel gear 10 to be engaged with a bevel gear 11 of the rotary tool input shaft 37 of the rotary tool unit 2*b* is fixed to the front end of the rotary tool driving shaft 8. As shown in FIG. 4, the rotary tool input shaft 37 having the bevel gear 11 and a bevel gear 37*d* is rotatably supported by the bearing fixed to the bearing case 44, and is rotatable with respect to an intermediate rotation axis AX3 that is different from the indexing axis AX1 in direction. The intermediate rotation axis AX3 shown in FIG. 4 is perpendicular to the indexing axis AX1, but this is not restrictive. When the rotary tool unit 2*b* is mounted on the turret surface 3, the bevel gear 11 on the side of the rotary tool unit 2*b* is engaged with the bevel gear 10 on the side of the turret tool post 1*a*. The rotary tool intermediate shaft 38 having a bevel gear 38*a* and a spur gear 38*b* is rotatable with respect to an axis that is different from the intermediate rotation axis AX3 in direction. The direction of the rotary tool intermediate shaft 38 shown in FIG. 4 perpendicularly crosses the intermediate rotation axis AX3, but this is not restrictive. The bevel gear 38*a* at the input side of the rotary tool intermediate shaft 38 is engaged with the bevel gear 37*d* of the rotary tool input shaft 37. The spur gear 38*b* at the output side of the rotary tool intermediate shaft 38 is engaged with a spur gear 39*a* of the rotary tool shaft 39. The rotary tool shaft 39 with the tool 7 mounted is rotatable with respect to an axis that is parallel with the rotary tool intermediate shaft 38. The structure of the rotary tool unit shown in FIG. 4 may be variously modified.

As shown in FIG. 6A, the rotary tool driving motor M2 rotates the connected rotary tool driving shaft 8 through a power transmission device G2 such as a transmission gear. A rotation driving force from the rotary tool driving shaft 8 is transmitted to the connected tool 7 through the above-stated shafts 37, 38, and 39. The NC device 80 sends a command to the motor M2 to rotate the tool 7, which is to be used for machining.

The unit pivoting driving shaft 12 provided inside the rotary tool driving shaft 8 is rotatably supported by a bearing 14 fixed to the gear box 13. The bevel gear 15 to be engaged with a bevel gear 17 of the unit pivoting connection shaft 16 is fixed to the front end of the unit pivoting driving shaft 12. As shown in FIG. 4, the unit pivoting connection shaft 16 having the bevel gear 17 and a groove 18 is rotatably supported by a bearing 23 fixed to the gear box 13, and is rotatable with respect to the intermediate rotation axis AX4 that is different from the indexing axis AX1 in direction. The intermediate rotation axis AX4 shown in FIG. 4 is perpendicular to the indexing axis AX1, facing vertically to the turret surface 3. The direction of the intermediate rotation axis AX4 may be deviated from the direction that is perpendicular to the indexing axis AX1. The concave groove 18 is formed at the output end of the unit pivoting connection shaft 16. A convex protrusion 19*b* is formed at the input end of the pivot input shaft 20*b*. When the rotary tool unit 2*b* is mounted on the turret surface 3, the protrusion 19*b* on the side of the rotary tool unit is inserted into the groove 18 on the side of the turret tool post, and the unit pivoting connection shaft 16 and the pivot input shaft 20*b* are thereby engaged with each other. The pivot input shaft 20*b* having the protrusion 19*b* is rotatable with respect to the intermediate rotation axis AX4. The decelerator 41 connected to the output end of the pivot input shaft 20*b* reduces rotation speed of the pivot input shaft 20*b*, with a predetermined ratio of, for example, about ¹⁄₂₀ to about ¹⁄₁₀₀, and transmits the reduced rotation speed to the pivot intermediate shaft 42. A spur gear 42*b* to be engaged with the spur gear 43 neighboring thereto is fixed to the output end of the pivot intermediate shaft 42. The pivoting shaft 45*b* having a spur gear 45*a*, which is to be engaged with the spur gear 43, is rotatable with respect to the intermediate rotation axis AX3. An output end of the pivoting shaft 45*b* is fixed to the pivoting portion 45.

As shown in FIG. 6A, the unit pivoting driving servo motor M3 rotates the connected unit pivoting connection shaft 16 though a power transmission device G3 such as a transmission gear and the unit pivoting driving shaft 12. A rotation driving force from the unit pivoting connection shaft 16 is transmitted to the connected pivoting portion 45 through the pivot input shaft 20*b*, the decelerator 41, the pivot intermediate shaft 42, the spur gear 43, and the pivoting shaft 45*b*. The NC device 80 sends a command to the motor M3 to rotate the pivoting portion 45 of the tool unit 2 to be used for machining. Accordingly, the direction of the rotation axis AX2 of the tool 7 is changed.

The gear box support shaft 21 provided inside the unit pivoting driving shaft 12 is solid and substantially formed in the shape of a circular cylinder. The rear end 21*b* of the gear box support shaft 21 is mounted on the tool post body 6 in a manner to be slightly reciprocable toward the indexing axis AX1. To the front end 21*a* of the gear box support shaft 21, the gear box 13 is fixed with a clamp piece 22. The gear box 13 is extended from the front end 21*a* of the gear box support shaft 21 toward the back side thereof so as to rotatably support the unit pivoting connection shaft 16 and the unit pivoting driving shaft 12. The gear box 13 is also supported by a bearing 25 fixed to a flange 24 screw-fixed to the turret 4, and therefore the turret 4 and the gear box 13 are relatively rotatable. When the turret 4 is rotated, the gear box 13 is not rotated, and the unit pivoting connection shaft 16 is thereby maintained to be vertical with respect to the indexed turret surface 3.

Figure 5A:
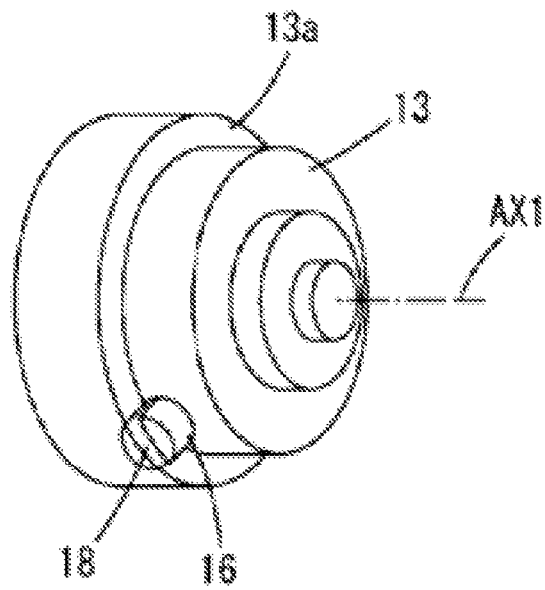
FIG. 5A is an exemplary perspective view of main parts of the turret tool post 1a, and FIG. 5B is an exemplary side view of the main parts of the turret tool post a1.
Figure 5B:
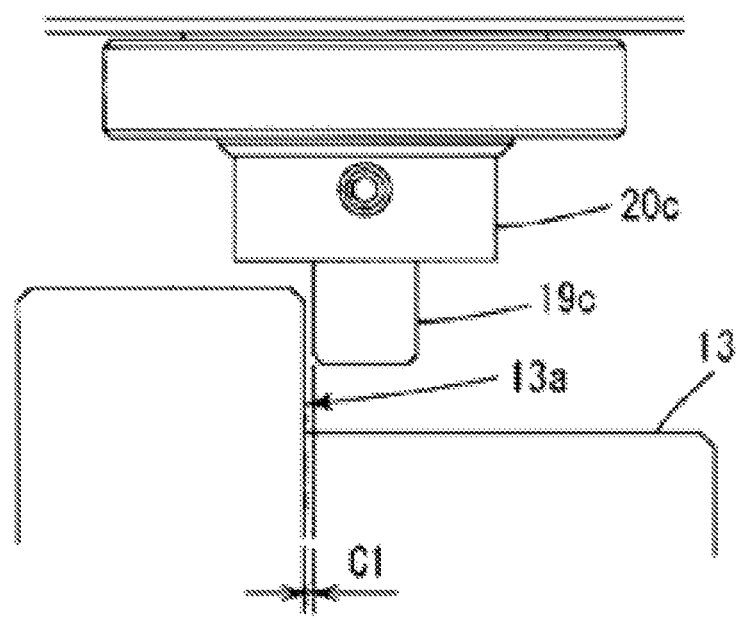

As shown in FIG. 5A and FIG. 5B, the gear box 13 has a guide surface 13*a* for maintaining a protrusion 19*c* of a pivot input shaft 20*c* at a non-indexed position in a predetermined direction. The guide surface 13*a* is a vertical surface with respect to the indexing axis AX1, and is connected to the groove 18 of the unit pivoting connection shaft 16 at the indexed position. The direction of the guide surface 13*a* may be deviated from the vertical surface with respect to the indexing axis AX1. As shown in FIG. 5B, rotation of the pivot input shaft 20*c* at the non-indexed position is restricted to maintain a narrow gap C1 between the protrusion 19*b* and the guide surface 13*a* as small as, for example, about 0.05 mm.

Indexing the tool unit 2 by pivoting the turret 4 is being described. The NC device 80 controls the unit pivoting connection shaft 16 to be maintained at a rotation position where the direction of the groove 18 matches the guide surface 13*a*. Thus, the pivot input shaft 20*b* is maintained at the rotation position where the surface of the protrusion 19*b* and the guide surface 13*a* are parallel with each other. Then, the NC device 80 first controls the turret 4 together with the turret pivoting driving shaft 5 to be moved forward to disengage the coupling members 51 and 52. Next, the NC device 80 drives the turret pivoting driving servo motor M1 to rotate the turret 4 together with the turret pivoting driving shaft 5 to a predetermined indexed position. In this case, since rotation of the protrusion 19*c* on the side of the rotary tool unit 2*c* is regulated by the guide surface 13*a*, for example, immediately until before the protrusion 19*c* is inserted into the groove 18, the unit pivoting connection shaft 16 on the turret tool post side is sure to be engaged with the pivot input shaft 20*c* on the rotary tool unit side. Finally, the NC device 80 controls the turret 4 together with the turret pivoting driving shaft 5 to be moved backward to engage the coupling members 51 and 52.

In the motor servo turret table disclosed in the Japanese Utility Patent No. 3129696, since a direction of the tool support head is not considered in indexing a tool unit, the gear wheel and the passive gear are sometimes difficult to be engaged due to collision of their gear teeth Rotating the tool 7 is being described. The NC device 80 controls the rotary tool driving motor M2 to rotate the rotary tool driving shaft 8. Thus, the rotation driving force from the rotary tool driving shaft 8 is transmitted to the tool 7 through the bevel gears 10 and 11, the rotary tool input shaft 37, the bevel gears 37*d* and 38*a*, the rotary tool intermediate shaft 38, the spur gears 38*b* and 39*a*, and the rotary tool shaft 39. The tool 7 is thereby rotated at a high speed.

Changing the direction of the rotation axis AX2 of the tool 7 is being described. The NC device 80 controls the unit pivoting driving servo motor M3 to rotate the unit pivoting driving shaft 12. Thus, the pivoting driving force from the unit pivoting driving shaft 12 is transmitted to the pivoting portion 45 through the bevel gears 15 and 17, the unit pivoting connection shaft 16, the groove 18, the protrusion 19*b*, the pivot input shaft 20*b*, the decelerator 41, the pivot intermediate shaft 42, the spur gears 42*b*, 43, and 45*a*, and the pivoting shaft 45*b*. The pivoting portion 45 is thereby rotated at a low speed to change the direction of the rotation axis AX2 of the tool 7.

Here, since the rotary tool driving shaft 8 and the unit pivoting driving shaft 12 are configured to be independently rotatable, the pivoting portion 45 is rotatable at a low speed while the tool 7 is rotatable at a high speed.

As previously described, since the rotary tool driving shaft 8 and the unit pivoting driving shaft 12 are coaxially arranged inside the turret pivoting driving shaft 5, the high-speed rotation operation and the tilt operation of the tool 7 can be simultaneously implemented with a simple structure. Accordingly, flexibility of workpiece machining can be expanded, manufacturing can be simplified, and the number of parts can be reduced so that an inexpensive turret tool post having a tool unit pivoting mechanism can be provided. In addition, according to the present invention, since the gear box 13 is fixed to the front end 21*a* of the gear box support shaft 21 whose rear end 21*b* is mounted on the tool post body 6, such a large-scaled structure as supporting the unit pivoting connection shaft from an outer side of the turret is not required, and accordingly the machine tool can be made compact.

3. Second Embodiment

FIG. 7 and FIG. 8 are partial cross-sectional view illustrating main parts of the turret tool post 1*a* where a coolant passage 33 is provided in the gear box support shaft 30 according to a second embodiment. For convenience of description, a turret surface at an indexed position is denoted as "a turret surface 3*b*", a rotary tool unit mounted on the turret surface 3*b* is denoted as "the rotary tool unit 2*b*", a turret surface at a non-indexed position is denoted as "a turret surface 3*c*", and a rotary tool unit mounted on the turret surface 3*c* is denoted as "the rotary tool unit 2*c*".

The second embodiment is different from the first embodiment in that the gear box support shaft 30 is a cylindrical member having the coolant passage 33, a passage switching joint 31 is mounted on the front end 21*a* of the gear box support shaft 30, a flange 32 having a passage (32*b*,32*c*) is provided, and the turret 4 is provided with a passage (4*b*, 4*c*). The passage switching joint 31 is provided with a passage 34 connecting the front end of the passage 33 of the gear box support shaft and the passage 32*b* of the flange 32. The passages 32*b* and 32*c* are connected to the passages 4*b* and 4*c* for distribution of coolant to each of the turret surfaces 3. The front end 21*a* of the gear box support shaft 30 is rotatably supported with respect to the flange 32. A description of configurations that are the same as those of the first embodiment will be omitted.

When the turret 4 is pivoted and thus the tool unit 2 is indexed, the coolant supplied from the rear side of the gear box support shaft 30 is guided to the tool unit 2 mounted on the turret surface 3*b* at the indexed position through the coolant passages 33, 34, 32*b*, and 4*b*. The gear box support shaft 30 is not rotated even though the turret 4 is pivoted, and therefore the position of the passage 34 of the passage switching joint 31 is not changed. Thus, in the turret tool post 1*a* shown in FIG. 7 and FIG. 8, coolant is not guided to the tool unit mounted on the turret surface 3*c* at a non-indexed position. Accordingly, coolant can be supplied only to the turret surface 3 at the indexed position without forming complex coolant pipes, achieving an effective coolant supply to the tool 7 area through the passage of the tool unit 2.

4. Third Embodiment

FIG. 9 and FIG. 10 are partial cross-sectional views illustrating main parts of the turret tool post 1*a* provided with a pivoting mechanism for pivotally controlling a rotary tool unit 102*b* mounted on a turret surface 103 according to a third embodiment. For convenience of description, a rotary tool unit mounted on the turret surface 103 at an indexed position is denoted as "a rotary tool unit 102*b*", and a rotary tool unit mounted on a turret surface at a non-indexed position is denoted as "a rotary tool unit 102*c*".

In the third embodiment, the turret tool post 1*a* is provided with the tool post body 106, the turret 104, the turret pivoting driving shaft 105, the rotary tool driving shaft 108, the rotary tool connection shaft 131, the unit pivoting driving shaft 112, the unit pivoting connection shaft 116, the gear box (i.e., connection shaft support) 113, and the gear box support shaft 121. Behind the coupling device 50, the gear box support shaft 121, the rotary tool driving shaft 108, the unit pivoting driving shaft 112, the turret pivoting driving shaft 105, and the tool post body 106 are coaxially arranged with respect to the indexing axis AX1 in the order with the gear box support shaft 121 arranged innermost and the tool post body 106 arranged outermost. The unit pivoting driving shaft 112, the rotary tool driving shaft 108, and the turret pivoting driving shaft 105 are independently rotatable with respect to the indexing axis AX1.

In addition, FIG. 11 is a partial cross-sectional view that exemplarily illustrating the rotary tool unit 102*b* mounted on the turret surface 103 of the turret 104. The rotary tool unit 102*b* includes a fixed portion 140 and a pivoting portion 145. The fixed portion 140 includes a rotary tool input shaft 137*b*, a pivot input shaft 120*b*, a decelerator 141, and a bearing case 144. The pivoting portion 145 includes a rotary tool intermediate shaft 38, a rotary tool shaft 39, and a pivoting shaft 145*a*.

The turret 104 is fixed to the front end of the turret pivoting driving shaft 105. The turret pivoting driving shaft 105 is rotatably supported by the tool post body 106 through a bearing. In addition, as in the first embodiment, the coupling device 50 is provided between the turret 104 and the tool post body 106. When the turret pivoting driving shaft 105 is moved backward by the cylinder, the coupling members 51 and 52 are engaged so that the turret 104 is maintained at a predetermined indexing position. When the turret pivoting driving shaft 105 is moved forward by the cylinder, the engagement between the coupling members 51 and 52 is released so that the turret 104 is allowed to be rotated.

Figure 6B:
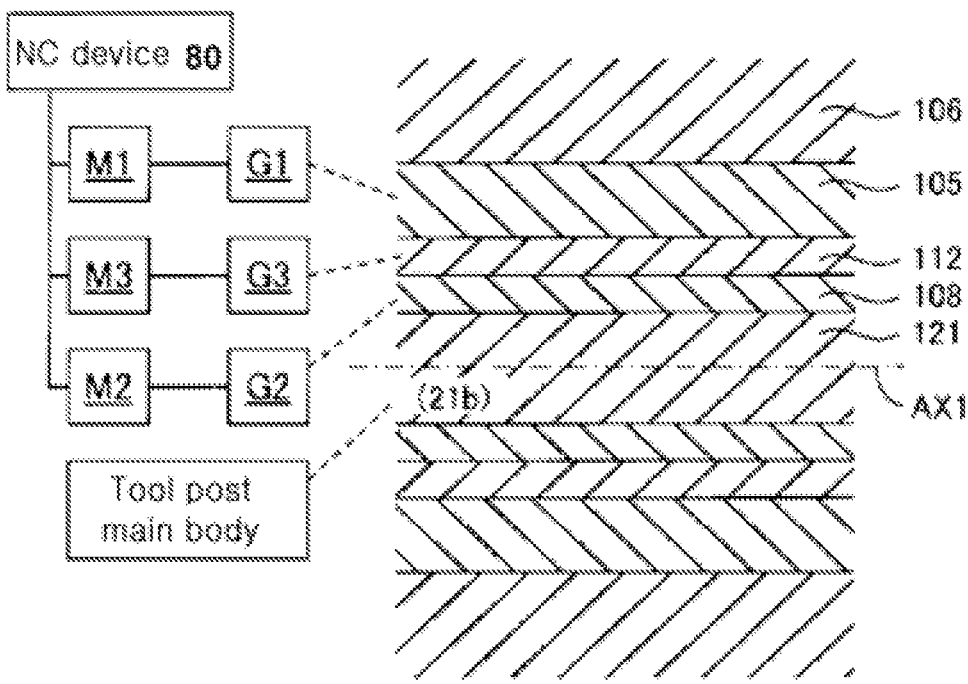

As shown in FIG. 6B, when the engagement between the coupling members 51 and 52 is released, the turret pivoting driving servo motor M1 is allowed to pivot the connected turret 104 through the power transmission device G1 such as the transmission gear and the turret pivoting driving shaft 105. The NC device 80 sends a command to the motor M1 to index the turret surface 103 where the tool unit 2 to be used is mounted. The lathe 1 machines the workpiece W1 held by the spindle 100 by sequentially indexing the tool unit 2 and moving the indexed tool unit 2 in the X, Y, and Z directions.

Figure 12A:
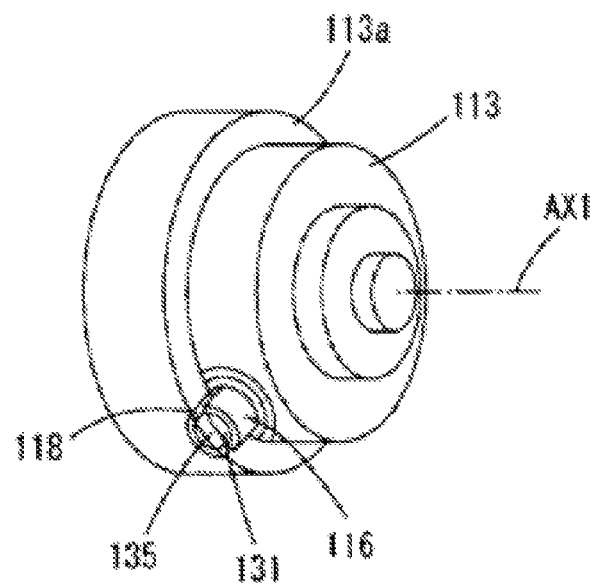
Figure 12B:
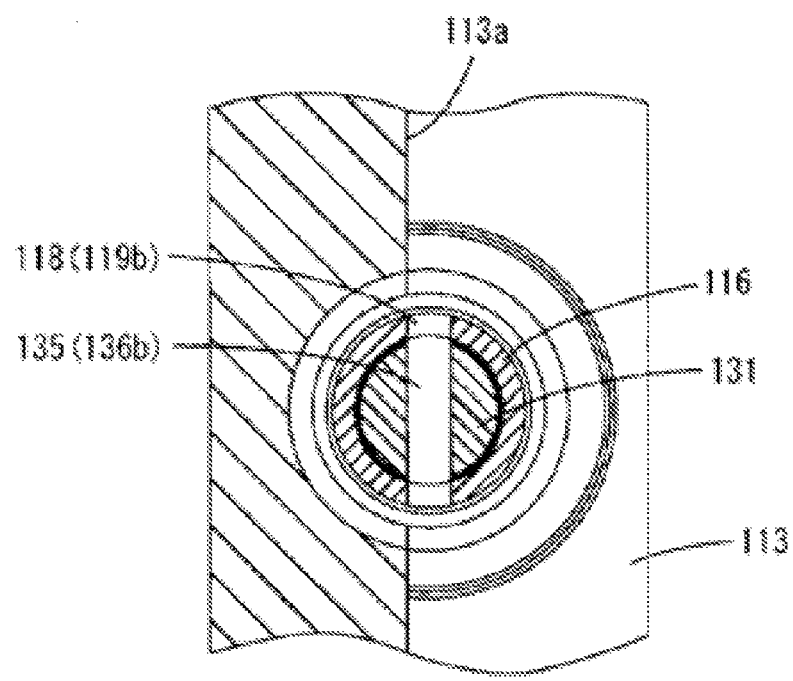

The unit pivoting driving shaft 112 provided inside the turret pivoting driving shaft 105 is rotatably supported by a bearing 114 fixed to the gear box 113. A bevel gear 115 to be engaged with a bevel gear 117 of the unit pivoting connection shaft 116 is fixed to the front end of the unit pivoting driving shaft 112 by thermal insert. As shown in FIG. 11, FIG. 12A and FIG. 12B, the unit pivoting connection shaft 116 having the bevel gear 117 and a groove 118 is rotatably supported by a bearing 130 fixed to the gear box 113, and is rotatable with respect to the intermediate rotation axis AX5 whose direction is different from the indexing axis AX1. The intermediate rotation axis AX5 shown in FIG. 11 is perpendicular to the indexing axis AX1, facing vertically to the turret surface 103. The direction of the intermediate rotation axis AX5 may be deviated from a direction that is perpendicular to the indexing axis AX1. The concave groove 118 is formed at the output end of the unit pivoting connection shaft 116. A convex protrusion 119b is formed at the input end of the pivot input shaft 120b. When the rotary tool unit 102b is mounted on the turret surface 103, the protrusion 119b on the side of the rotary tool unit is inserted into the groove 118 on the turret tool post side, and the unit pivoting connection shaft 116 and the pivot input shaft 120b are thereby engaged with each other. The pivot input shaft 120b having the protrusion 119b is rotatable with respect to the intermediate rotation axis AX5. The decelerator 141 connected to the output end of the pivot input shaft 120b reduces the rotation speed of the pivot input shaft 120b by a predetermined ratio, for example, about ½0 to ¹⁄100, and transmits the reduced rotation speed to the pivoting shaft 145a. The output end of the pivoting shaft 145a is fixed to the pivoting portion 145.

As shown in FIG. 6B, the unit pivoting driving servo motor M3 rotates the connected unit pivoting connection shaft 116 through the power transmission device G3 such as the transmission gear and the unit pivoting driving shaft 112. A pivoting driving force from the unit pivoting connection shaft 116 is transmitted to the pivoting portion 145 through the pivot input shaft 120b, the decelerator 141, and the pivoting shaft 145a. The NC device 80 sends a command to the motor M3 to rotate the pivoting portion 145 of the tool unit 2 to be used for machining. Accordingly, the direction of the rotation axis AX2 of the tool 107 is changed.

The rotary tool driving shaft 108 provided inside the unit pivoting driving shaft 112 is rotatably supported by a bearing 119 fixed to the unit pivoting driving shaft 112. A bevel gear 110 to be engaged with a bevel gear 111 of the rotary tool connection shaft 131 is fixed to the front end of the rotary tool driving shaft 108. The rotary tool connection shaft 131 having the bevel gear 111 and the groove 135 is inserted into the unit pivoting connection shaft 116, and is rotatably supported by a bearing 133 fixed to a gear box 113 and a bearing 134 fixed to the unit pivoting connection shaft 116. That is, the rotary tool connection shaft 131 is rotatable with respect to the intermediate rotation axis AX5 whose direction is different from the indexing axis AX1. The bevel gear 111 is fixed to the input end of the rotary tool connection shaft 131 by a clamp piece 132. A concave groove 135 is formed in the output end of the rotary tool connection shaft 131. A convex protrusion 136b is formed at the input end of the rotary input shaft 137b of the rotary tool unit 102b. When the rotary tool unit 102b is mounted on the turret surface 103, the protrusion 136b on the rotary tool unit side is inserted into the groove 135 on the turret tool post side so that the rotary tool connection shaft 131 and the rotary tool input shaft 137b are engaged with each other. The rotary tool input shaft 137b having the protrusion 136b is provided inside the pivot input shaft 120b, and is rotatably supported by a bearing fixed to the pivot input shaft 120b. That is, the rotary tool input shaft 137b is rotatable with respect to the intermediate rotation axis AX5. The direction of the rotary tool intermediate shaft 38 shown in FIG. 11 perpendicularly crosses the intermediate rotation axis AX5, but this is not restrictive. A bevel gear 38a at the input side is engaged with a bevel gear 37d of the rotary tool input shaft 137d. A spur gear 38b at the output side is engaged with a spur gear 39a of the rotary tool shaft 39. The rotary tool shaft 39 where the tool 107 is mounted is configured to be rotatable with respect to an axis that is parallel with the rotary tool intermediate shaft 38. The structure of the rotary tool unit shown in FIG. 11 may be variously modified.

As shown in FIG. 6B, the rotary tool driving motor M2 rotates the rotary tool driving shaft 108 through the power transmission device G2 such as the transmission gear. A rotation driving force from the rotary tool driving shaft 108 is transmitted to the connected tool 107 through the above-stated shafts 131, 137b, 38, and 39. The NC device 80 sends a command to the motor M2 to rotate the tool 107 to be used for machining.

A solid gear box support shaft 121 provided inside the rotary tool driving shaft 108 is substantially formed in the shape of a circular cylinder. The rear end 21b of the gear box support shaft 121 is mounted to the tool post body 106 in a manner to be slightly reciprocable toward the indexing axis AX1. To the front end 21a of the gear box support shaft 121, the gear box 113 is fixed with a clamp piece 122. The gear box 113 is extended from the front end 21a of the gear box support shaft toward the back side thereof so as to rotatably support the unit pivoting connection shaft 116, the rotary tool connection shaft 131, and the unit pivoting driving shaft 112. The gear box 113 is also supported by a bearing 125 that is fixed to a flange 124 screw-fixed to the turret 104, and therefore the turret 104 and the gear box 113 are relatively rotatable. When the turret 104 is rotated, the gear box 113 is not rotated, and therefore the unit pivoting connection shaft 116 and the rotary tool connection shaft 131 are maintained to be vertical with respect to the indexed turret surface 103.

As shown in FIG. 12A and FIG. 12B, the gear box 113 has a guide surface 113a for maintaining a protrusion 119c of a pivot input shaft 120c and a protrusion 136c of the rotary tool input shaft at a non-indexed position in a predetermined direction. The guide surface 113a is a vertical surface with respect to the indexing axis AX1, and is connected to the groove 118 of the unit pivoting connection shaft 116 and the groove 135 of the rotary tool connection shaft 131 at the indexed position. The direction of the guide surface 113a may be deviated from the vertical surface with respect to the indexing axis AX1. As shown in FIG. 12B, rotation of the pivot input shaft 120c and the rotary tool input shaft 137b at the non-indexed position are restricted to maintain a narrow gap between the protrusions 119b and 136b and the guide surface 113a as small as, for example, about 0.05 mm.

Indexing the tool unit 2 by pivoting the turret 104 is being described. The NC device 80 controls the unit pivoting connection shaft 116 to be maintained at a rotation position where a direction of the groove 118 matches the guide surface 113a, and controls the rotary tool connection shaft 131 to be maintained at a rotation position where a direction of the groove 135 matches the guide surface 113a. Thus, the pivot input shaft 120b is maintained at the rotation position where the surface of the protrusion 119b and the guide surface 113a are parallel with each other, and the rotary tool input shaft 137b is thereby maintained at the rotation position where the surface of the protrusion 136b is parallel with the guide surface 113a. Then, the NC device 80 first controls the turret 104 together with the turret pivoting driving shaft 105 to be moved forward to release the engagement between the coupling members 51 and 52. Next, the NC device 80 drives the turret pivoting driving servo motor M1 to rotate the turret 104 together with the turret pivoting driving shaft 105 to a predetermined indexed position. In this case, since rotation of each of the protrusions 119c and 136c is regulated by the guide surface 113a immediately until before the protrusions 119c and 136c of the rotary tool unit 102c are inserted to the grooves 118 and 135, the unit pivoting connection shaft 116 and the rotary tool connection shaft 131 on the turret tool post side are sure to be engaged with the pivot input shaft 120c and the rotary tool input shaft 137b on the rotary tool unit side. Finally, the NC device 80 controls the turret 104 together with the turret pivoting driving shaft 105 to be moved backward to engage the coupling members 51 and 52.

Rotating the tool 107 is being described. The NC device 80 controls the rotary tool driving motor M2 to rotate the rotary tool driving shaft 108. Rotation driving force from the rotary tool driving shaft 108 is transmitted to the tool 107 through the bevel gears 110 and 111, the rotary tool connection shaft 131, the groove 135, the protrusion 136b, the rotary tool input shaft 137b, the bevel gears 37d and 38a, the rotary tool intermediate shaft 38, the spur gears 38b and 39a, and the rotary tool shaft 39. The tool 107 is thereby rotated at a high speed.

Changing the direction of the rotation axis AX2 of the tool 107 is being described. The NC device 80 controls the unit pivoting driving servo motor M3 to rotate the unit pivoting driving shaft 112. Pivoting driving force from the unit pivoting driving shaft 112 is transmitted to the pivoting portion 145 through the bevel gears 115 and 117, the unit pivoting connection shaft 116, the groove 118, the protrusion 119b, the pivot input shaft 120b, the decelerator 141, and the pivoting shaft 145a. The pivoting portion 145 is thereby rotated at a low speed to change the direction of the rotation axis AX2 of the tool 107. Here, since the rotary tool driving shaft 108 and the unit pivoting driving shaft 112 are configured to be independently rotatable, the pivoting portion 145 is rotatable at a low speed while the tool 107 is rotatable at a high speed.

As previously described, in the present embodiment, the rotary tool driving shaft 108 and the unit pivoting driving shaft 112 are coaxially provided inside the turret pivoting driving shaft 105, and accordingly, a high-speed rotation operation and a tilt operation of the tool 107 can be simultaneously implemented with a simple structure. In addition, the rotary tool connection shaft 131 and the unit pivoting connection shaft 116 are coaxially arranged with respect to the intermediate rotation axis AX5, which is different from the indexing axis AX1 in direction, and therefore the turret can be reduced in size so that the machine tool can be made more compact. Accordingly, the degree of freedom in machining of the workpiece W1 can be improved, manufacturing can be simplified and the number of parts can be reduced.

In addition, as in the second embodiment, the coolant passage may be formed in the gear box support shaft 121 so that coolant is supplied to the tool unit 2 mounted on the turret surface at the indexed position.

5. Other Exemplary Variations

The present invention may include various exemplary variations.

For example, the connection shaft support, which is embodied in the gear box, for rotatably supporting both of the rotary tool connection shaft and the unit pivoting connection shaft as in the third embodiment, may rotatably support only one of the unit pivoting connection shaft and the rotary tool connection shaft.

The gear box is preferably fixed to the front end of the support shaft arranged inside the rotary tool driving shaft and the unit pivoting driving shaft to make the machine tool compact, but a different structure may be employed. For example, the gear box may be fixed to a non-pivoting member, which is provided ahead of the front of the turret so as to be off-centered with respect to the indexing axis. In this case, the unit pivoting driving shaft 12 of the first embodiment may be solid and substantially cylindrical, and the rotary tool driving shaft 108 of the third embodiment may be solid and substantially cylindrical.

The present invention applied to a lathe may also be applied to another machine tool.

In addition, even if a machine tool formed of constituent elements related to independent claims and does not include constituent elements related to dependent claims, the above-described action and effect can be acquired.

As described above, according to the present invention, a method for simultaneously implementing high-speed rotation and tilt operation of a tool with a simple structure can be provided.

In addition, each configuration of the above-stated embodiments and exemplary variations may be replaced, a combination thereof may be modified, and each configuration of the known methods, the above-stated embodiments, and the exemplary variations may also be replaced or a combination thereof may be modified. The present invention includes the above-stated configurations.

DESCRIPTION OF SYMBOLS

1 . . . lathe (machine tool),
1a . . . turret tool post,
2 . . . tool unit,
2a . . . stationary tool unit,
2b, 2c, 102b, 102c . . . rotary tool unit,
3, 3b, 3c, 103 . . . turret surface,
4, 104 . . . turret,
4b, 4c, 32b, 32c, 33, 34 . . . coolant passage,
5, 105 . . . turret pivoting driving shaft,
6, 106 . . . tool post body,
7, 107 . . . tool,
8, 108 . . . rotary tool driving shaft,
9, 14, 23, 25, 114, 119, 125, 130, 133, 134 . . . bearing,
10, 11, 15, 17, 110, 111, 115, 117 . . . bevel gear, 12, 112 . . . unit pivoting driving shaft,
13, 113 . . . gear box (connection shaft support),
13a, 113a . . . guide surface,
16, 116 . . . unit pivoting connection shaft,
18, 118, 135 . . . groove,
19b, 19c, 119b, 119c, 136b, 136c . . . protrusion,
20b, 20c, 120b, 120c . . . pivot input shaft,
21, 30, 121 . . . gear box support shaft (support shaft),
21a . . . front end of support shaft,
21b . . . rear end of support shaft,
22, 122, 132 . . . clamp piece,
24, 32, 124 . . . flange,
31 . . . passage switching joint,
37, 137b . . . rotary tool input shaft,
38 . . . rotary tool intermediate shaft,
39 . . . rotary tool shaft,
40, 140 . . . fixed portion,
41, 141 . . . decelerator,
42 . . . pivot intermediate shaft,
44, 144 . . . bearing case,
45, 145 . . . pivoting portion,
50 . . . coupling device,
100 . . . spindle,
102 . . . headstock,
131 . . . rotary tool connection shaft,
AX1 . . . indexing axis,
AX2 . . . rotation axis of tool,
AX3-AX5 . . . intermediate rotation axis,
G1, G2, G3 . . . power transmission device,
M1 . . . turret pivoting driving servo motor,
M2 . . . rotary tool driving motor,
M3 . . . unit pivoting driving servo motor,
W1 . . . workpiece.

The invention claimed is:

1. A machine tool to which a rotary tool unit is adapted to be mounted comprising:
   a turret to which a tool unit is adapted to be radially mounted with respect to an indexing axis;
   a cylindrical turret pivoting driving shaft adapted to be rotated with respect to the indexing axis for transmission of pivoting driving force to the turret;
   a rotary tool driving shaft adapted to be rotated with respect to the indexing axis for transmission of rotation driving force to a tool of the rotary tool unit mounted on the turret; and
   a unit pivoting driving shaft adapted to be rotated with respect to the indexing axis independently of the rotary tool driving shaft for transmission of pivoting driving force to the rotary tool unit mounted on the turret to change the direction of a rotation axis of the tool;
   wherein the rotary tool driving shaft and the unit pivoting driving shaft are coaxially arranged inside the turret pivoting driving shaft.

2. The machine tool of claim 1, further comprising a support shaft one of whose ends is mounted on a tool post body,
   wherein the rotary tool driving shaft and the unit pivoting driving shaft are both formed in the shape of a cylinder;
   the support shaft is provided inside the rotary tool driving shaft and the unit pivoting driving shaft with respect to the indexing axis; and
   a connection shaft support is fixed on the other end of the support shaft to support at least one of a rotary tool connection shaft and a unit pivoting connection shaft, the rotary tool connection shaft being rotatable with respect to an axis whose direction is different from the indexing axis for transmission of rotation driving force from the rotary tool driving shaft to the tool of the indexed rotary tool unit, and the unit pivoting connection shaft being rotatable with respect to an axis whose direction is different from the indexing axis for transmission of pivoting driving force from the unit pivoting driving shaft to the indexed rotary tool unit.

3. The machine tool of claim 2, wherein the rotary tool connection shaft and the unit pivoting connection shaft are coaxially provided with respect to the axis whose direction is different from the indexing axis.

\* \* \* \* \*